(12) United States Patent
Hobson et al.

(10) Patent No.: US 6,613,203 B1
(45) Date of Patent: Sep. 2, 2003

(54) ION CONDUCTING MEMBRANE HAVING HIGH HARDNESS AND DIMENSIONAL STABILITY

(75) Inventors: Alex R. Hobson, Elkton, MD (US); Stephen J. MacKenzie, Bear, DE (US)

(73) Assignee: Gore Enterprise Holdings, Newark, DE (US)

( * ) Notice: Subject to any disclaimer, the term of this patent is extended or adjusted under 35 U.S.C. 154(b) by 0 days.

(21) Appl. No.: 09/950,839

(22) Filed: Sep. 10, 2001

(51) Int. Cl.$^7$ ............................................. C25B 13/00
(52) U.S. Cl. ........................ 204/296; 429/30; 429/33; 428/306.6; 428/311.1; 428/311.51; 428/315.5; 428/316.6
(58) Field of Search ............................. 429/30, 33, 40, 429/41, 42, 43, 44, 45; 204/296; 428/306.6, 311.1, 311.51, 315.5, 316.6

(56) References Cited

U.S. PATENT DOCUMENTS

| 2,681,319 A | 6/1954 | Bodamer | 260/2.1 |
| 2,827,426 A | 3/1958 | Bodamer | 204/98 |

(List continued on next page.)

FOREIGN PATENT DOCUMENTS

| EP | 0267719 | 5/1988 |
| EP | 0313263 | 4/1989 |
| EP | 0463106 | 2/1994 |
| EP | 0594007 | 4/1994 |
| EP | 0707033 | 4/1996 |
| GB | 2025835 | 1/1980 |
| GB | 2052382 | 1/1981 |
| GB | 2091166 | 7/1982 |
| GB | 2097788 | 11/1982 |
| JP | 51-71888 | 6/1976 |
| JP | 57-134586 | 8/1982 |
| JP | 60-84590 | 5/1985 |
| JP | 61-276987 | 12/1986 |
| JP | 62-240627 | 9/1987 |
| JP | 62-280230 | 12/1987 |
| JP | 63-11979 | 1/1988 |
| JP | 64-78823 | 3/1989 |
| JP | 3-221541 | 9/1991 |
| JP | H6-29032 | 2/1994 |
| JP | 6-29032 | 2/1994 |
| JP | 6-256549 | 9/1994 |
| JP | 11-67246 | 3/1999 |
| WO | 89/06055 | 6/1989 |
| WO | 91/14021 | 3/1990 |
| WO | 9222604 | 12/1992 |
| WO | 9318214 | 9/1993 |
| WO | 95-16730 | 6/1995 |

OTHER PUBLICATIONS

"Composite Membranes for Fuel–Cell Applications", Mark W. Verbrugge et al., AICHE Journal, Jan. 1992, vol. 38, No. 1 pp. 93–100.

Literature: R. M. Penner and C. R. Martin. "Ion Transporting Composite Membranes", Journal Electrochem Soc. vol. 132, No. 2, Feb. 1985, pp. 514–515.

Journal Electrochem. Soc., vol. 137, No. 2—"Ion Transporting Composite Membranes", C. Liu and C. R. Martin, Feb. 1990, pp. 510–515.

Journal Electrochem. Soc., vol. 132, No. 2, —"Ion Transporting Composite Membranes", R. M. Penner and C. R. Martin, Feb. 1985, pp. 514–515.

*Primary Examiner*—Bruce F. Bell
(74) *Attorney, Agent, or Firm*—Allan M. Wheatcraft

(57) ABSTRACT

An integral composite membrane comprised of an expanded polytetrafluoroethylene having a morphological structure comprising a microstructure of very highly elongated nodes interconnected by fibrils is imbibed with ionomer. This composite membrane shows a surprising increase in hardness and thereby reduces electrical shorting and improves fuel cell performance and durabiity.

21 Claims, 3 Drawing Sheets

U.S. PATENT DOCUMENTS

| | | | |
|---|---|---|---|
| 2,951,818 A | 9/1960 | Hagen .......................... 260/21 |
| 2,965,697 A | 12/1960 | Duddy ....................... 136/146 |
| 3,692,569 A | 9/1972 | Grot ........................ 117/138.8 |
| 3,953,566 A | 4/1976 | Gore .......................... 264/288 |
| 4,012,303 A | 3/1977 | D'Agostino et al. ... 204/159.17 |
| 4,065,534 A | 12/1977 | Rechlicz et al. .............. 264/91 |
| 4,082,893 A | 4/1978 | Okita ......................... 428/376 |
| 4,104,394 A | 8/1978 | Okita .......................... 264/89 |
| 4,110,392 A | 8/1978 | Yamazaki ................... 264/127 |
| 4,186,076 A | 1/1980 | de Nora et al. |
| 4,187,390 A | 2/1980 | Gore |
| 4,207,163 A | 6/1980 | Kadija ........................ 204/253 |
| 4,207,164 A | 6/1980 | Kadija ........................ 204/253 |
| 4,210,510 A | 7/1980 | Grimes ....................... 204/195 |
| 4,218,542 A | 8/1980 | Ukihashi et al. ............. 521/27 |
| 4,224,121 A | 9/1980 | Dempsey et al. ............. 204/98 |
| 4,255,523 A | 3/1981 | Ukihashi et al. ............. 521/27 |
| 4,262,041 A | 4/1981 | Eguchi et al. ............... 427/245 |
| 4,311,567 A | 1/1982 | White ......................... 204/98 |
| 4,313,832 A | 2/1982 | Shimizu et al. ............. 210/663 |
| 4,341,615 A | 7/1982 | Bachot et al. ............... 204/296 |
| 4,433,082 A | 2/1984 | Grot ........................... 524/755 |
| 4,453,991 A | 6/1984 | Grot ............................. 156/94 |
| 4,469,744 A | 9/1984 | Grot et al. .................. 428/246 |
| 4,518,650 A | 5/1985 | Grot et al. .................. 428/286 |
| 4,528,083 A | 7/1985 | LaConti et al. ............. 204/265 |
| 4,596,837 A | 6/1986 | Yamamoto et al. ......... 521/145 |
| 4,598,011 A | 7/1986 | Bowman .................... 428/221 |
| 4,604,170 A | 8/1986 | Miyake et al. ................ 204/98 |
| 4,629,563 A | 12/1986 | Wrasidlo ............... 210/500.34 |
| 4,664,801 A | 5/1987 | Thomas ...................... 210/489 |
| 4,671,754 A | 6/1987 | Okita et al. ................... 425/66 |
| 4,698,243 A | 10/1987 | Carl et al. ................... 427/341 |
| 4,714,748 A | 12/1987 | Hoashi et al. ............... 526/255 |
| 4,760,102 A | 7/1988 | Moriyama et al. .......... 521/145 |
| 4,774,039 A | 9/1988 | Wrasidlo ...................... 264/41 |
| 4,804,592 A | 2/1989 | Vanderborgh et al. ........ 429/33 |
| 4,849,311 A | 7/1989 | Itoh et al. ................... 429/192 |
| 4,863,604 A | 9/1989 | Lo et al. ..................... 210/490 |
| 4,865,925 A | 9/1989 | Ludwig et al. ............... 429/12 |
| 4,865,930 A | 9/1989 | Kindler et al. .............. 429/192 |
| 4,902,308 A | 2/1990 | Mallouk et al. ............... 55/16 |
| 4,902,423 A | 2/1990 | Bacino ................... 210/500.36 |
| 4,931,168 A | 6/1990 | Watanabe et al. ........... 204/284 |
| 4,949,284 A | 8/1990 | Watanabe ................... 364/520 |
| 4,954,388 A | 9/1990 | Mallouk et al. ............ 428/198 |
| 4,985,296 A | 1/1991 | Mortimer, Jr. .............. 428/220 |
| 4,990,228 A | 2/1991 | Perusich et al. .............. 204/98 |
| 4,997,567 A | 3/1991 | Messalem et al. .......... 210/490 |
| 5,041,195 A | 8/1991 | Taylor et al. ................. 204/96 |
| 5,066,403 A | 11/1991 | Dutta et al. ................. 210/638 |
| 5,075,006 A | 12/1991 | Schucker ............... 210/500.27 |
| 5,082,472 A | 1/1992 | Mallouk et al. ................ 55/16 |
| 5,094,895 A | 3/1992 | Branca et al. ........... 428/36.91 |
| 5,098,625 A | 3/1992 | Huang et al. ............... 264/127 |
| 5,124,018 A | 6/1992 | Furuya et al. .............. 204/284 |
| 5,133,842 A | 7/1992 | Taylor et al. .................. 204/98 |
| 5,154,827 A | 10/1992 | Ashelin et al. ............. 210/490 |
| 5,167,890 A | 12/1992 | Sasshofer et al. ........... 264/127 |
| 5,183,545 A | 2/1993 | Branca et al. .............. 204/252 |
| 5,186,877 A | 2/1993 | Watanabe ................... 264/104 |
| 5,190,813 A | 3/1993 | Ohashi et al. ........... 428/319.3 |
| 5,209,850 A | 5/1993 | Abayasekara et al. |
| 5,217,666 A | 6/1993 | Tamaru et al. .............. 264/112 |
| 5,225,131 A | 7/1993 | Tamaru et al. .............. 264/113 |
| 5,234,739 A | 8/1993 | Tamaru et al. .............. 428/131 |
| 5,234,751 A | 8/1993 | Harada et al. .............. 428/224 |
| 5,234,777 A | 8/1993 | Wilson ......................... 429/33 |
| 5,256,503 A | 10/1993 | Cook et al. .................. 429/249 |
| 5,275,725 A | 1/1994 | Ishii et al. ............. 210/321.67 |
| 5,288,384 A | 2/1994 | Banerjee ..................... 204/252 |
| 5,336,384 A | 8/1994 | Tsou et al. .................. 204/252 |
| 5,350,643 A | 9/1994 | Imahashi et al. ............. 429/33 |
| 5,356,663 A | 10/1994 | Perusich et al. ............. 427/140 |
| 5,415,888 A | 5/1995 | Banerjee et al. ............. 427/125 |
| 5,447,636 A | 9/1995 | Banerjee ..................... 210/638 |
| 5,474,824 A | 12/1995 | Martakos et al. .......... 428/36.9 |
| 5,521,023 A | 5/1996 | Kejha et al. ................. 429/142 |
| 5,545,475 A | 8/1996 | Korleski ................... 428/306.6 |
| 5,547,551 A | 8/1996 | Bahar et al. ................ 204/296 |
| 5,552,100 A | 9/1996 | Shannon et al. ............. 264/127 |
| 5,599,614 A | * 2/1997 | Bahar et al. ................ 204/296 |
| 5,635,041 A | * 6/1997 | Bahar et al. ................ 204/296 |
| 5,672,438 A | 9/1997 | Banerjee et al. .............. 429/33 |
| 5,814,405 A | * 9/1998 | Branca et al. ......... 428/311.51 |
| 6,042,959 A | * 3/2000 | Debe et al. ................... 429/33 |
| 6,130,175 A | * 10/2000 | Rusch et al. .............. 428/316.6 |
| 6,235,662 B1 | * 5/2001 | Zehnder .................. 428/316.6 |
| 6,242,135 B1 | * 6/2001 | Mushiake .................... 429/30 |
| 6,254,978 B1 | * 7/2001 | Bahar et al. .............. 428/305.5 |
| RE37,307 E | 8/2001 | Bahar et al. ................ 204/296 |

* cited by examiner

ION CONDUCTING MEMBRANE HAVING HIGH HARDNESS AND DIMENSIONAL STABILITY

FIELD OF THE INVENTION

The present invention relates to ion conducting membranes (ICMs) and more specifically, ICMs that are used in Polymer Electrolyte Membrane (PEM) fuel cells.

BACKGROUND OF INVENTION

In PEM fuel cell applications, a proton conductive membrane is placed between two electrodes, an anode and a cathode, and in some cases the electrodes are bonded directly to the membrane. Protons are conducted through the ICM from the anode to the cathode, and the conductance of the membrane affects the performance and power density of the fuel cell. In order to improve the performance of fuel cells, the resistance of the ICM must be reduced. One means to reduce the resistance is to reduce the thickness of the ICM. However with extruded or cast films of ionomer, the strength of the layer is reduced along with the thickness, making the films less dimensionally stable and difficult to handle.

A reinforced ion exchange membrane is described in JP11067246 to Asahi Glass. In this invention, the ICM is reinforced with fluorocarbon polymer fibers woven into a cloth consisting of warp and weft fibers between 10 and 100 denier. This composite provides increased strength for thin membrane composites.

A composite ICM described in U.S. Pat. No. 5,547,551 to Bahar, et. al. describes a base material and an ion exchange resin. The base material is a membrane which is defined by a thickness of less than 1 mil (0.025 mm) and a microstructure characterized by nodes interconnected by fibrils, or a microstructure characterized by fibrils with no nodes present. The ion exchange resin substantially impregnates the membrane such that the membrane is essentially air impermeable. In an integral composite membrane the strength is enhanced by the microporous membrane allowing further reduction of the thickness of the layer, and thereby lowering the resistance to proton transport. These thin integral composite membranes thus are able to provide lower resistance, while maintaining high strength.

The PEM fuel cell system is however a very aggressive environment for any thin membrane. In order to minimize electrical contact resistance between the components, the cells are typically compressed to approximately 50 to 400 psi. At these high pressures, thin membranes are susceptible to electrical shorting across the electrodes. In addition, at high pressures longer term mechanical stability properties become important for the ICM. Although the microporous reinforcement of the ICM enhances strength, which reduces swelling and tearing, known reinforcements do not provide adequate through-plane resistance to puncture. As used herein, "in-plane" means parallel to the plane of the sheet of material, and "through-plane" means vertically through the plane of the sheet of material.

On either side of the ICM there is typically an electrode comprised of carbon particles, ionomer, and catalyst. Outside of the electrode layers a gas diffuison layer comprising carbon fibers, in either a woven or non-woven form, is usually placed. In some cases, a micro layer is applied to the gas diffusion media which comprises carbon or graphite particles, ionomer and fluoropolymer. Most gas diffusion media is very rough relative to the ICM layer. In addition, the thickness variability of the gas diffusion media can be large, especially for woven type gas diffusion media. Thickness variations of 0.002 to 0.004" are common for woven type gas diffusion media. Non-uniformity of gas diffusion media thickness can lead to high pressure areas upon assembly. These high pressure areas can cause thinning of the ICM and in some cases electrical shorting across the anode and cathode. Furthermore, the rigid carbon fibers of the gas diffusion media can puncture through the ICM and create an electrical short during fuel cell assembly or some time later as a result of continued penetration of the fiber through the ICM over time. Fuel cells are normally run at an elevated temperature that can accelerate compressive mechanical creep of ionomers. Such creep may also thin the ICM, increasing the propensity of the fibers from the gas diffusion media to penetrate through the ICM layer.

Another challenge for thin ICM is compressive creep around electrode thickness non-uniformities. In cases where the electrode layers are not uniform in thickness, the pressure exerted on the ICM can vary dramatically. In the thick electrode areas where the pressure is elevated, creep may occur more rapidly, further thinning the ICM layer. Eventually, the compressive creep of the ICM may result in anode to cathode contact and an electronic short across the membrane.

Electronic shorts through the ICM result in reduced efficiency of the fuel cell. The voltage drop across the electronic short through the membrane has to be the same as the operating voltage of the cell. Therefore, a corresponding current is drawn away from the fuel cell and is carried through the electronic short. The lower the resistance value of the short, the higher the associated current.

It is therefore necessary to provide a thin ICM that retains the low ionic resistance but that more effectively resists puncture and subsequent shorting. Another necessity is to minimize the in-plane dimensional changes as a function of hydration. Through-plane hydration expansion is a desired property however, as it will further reduce contact resistance between components in the fuel cell.

SUMMARY OF THE INVENTION

The present invention is a distinct improvement over the previously known ion conducting composite membranes, in that it has increased hardness and dimensional stability. In one embodiment of the present invention, an integral composite membrane comprised of an expanded polytetrafluoroethylene having a morphological structure comprising a microstructure of very highly elongated nodes interconnected by fibrils is imbibed with ionomer. This composite membrane shows a surprising increase in hardness and thereby reduces electrical shorting and improves fuel cell performance and durability.

Specifically, the present invention provides a composite membrane formed of (a) an expanded polytetrafluoroethylene membrane having an internal microstructure of nodes interconnected by fibrils, the nodes aligned substantially in parallel, being highly elongated and having an aspect ratio of 25:1 or greater; and (b) an ion exchange material impregnated throughout the membrane, the impregnated expanded polytetrafluoroethylene membrane having a Gurley number of greater than 10,000 seconds, wherein the ion exchange material substantially impregnates the membrane so as to render an interior volume of the membrane substantially occlusive.

In another aspect, the present invention provides a composite membrane comprising a base material having a microstructure of nodes and fibrils forming interconnected passages and pathways and having a hardness greater than 1000 mPa, and an ion exchange material impregnated throughout the base material, the composite membrane having a Gurley number of greater than 10,000 seconds, wherein the ion exchange material substantially impregnates the base membrane so as to render the passages and pathways substantially occlusive.

DETAILED DESCRIPTION OF THE INVENTION

Figure 1:
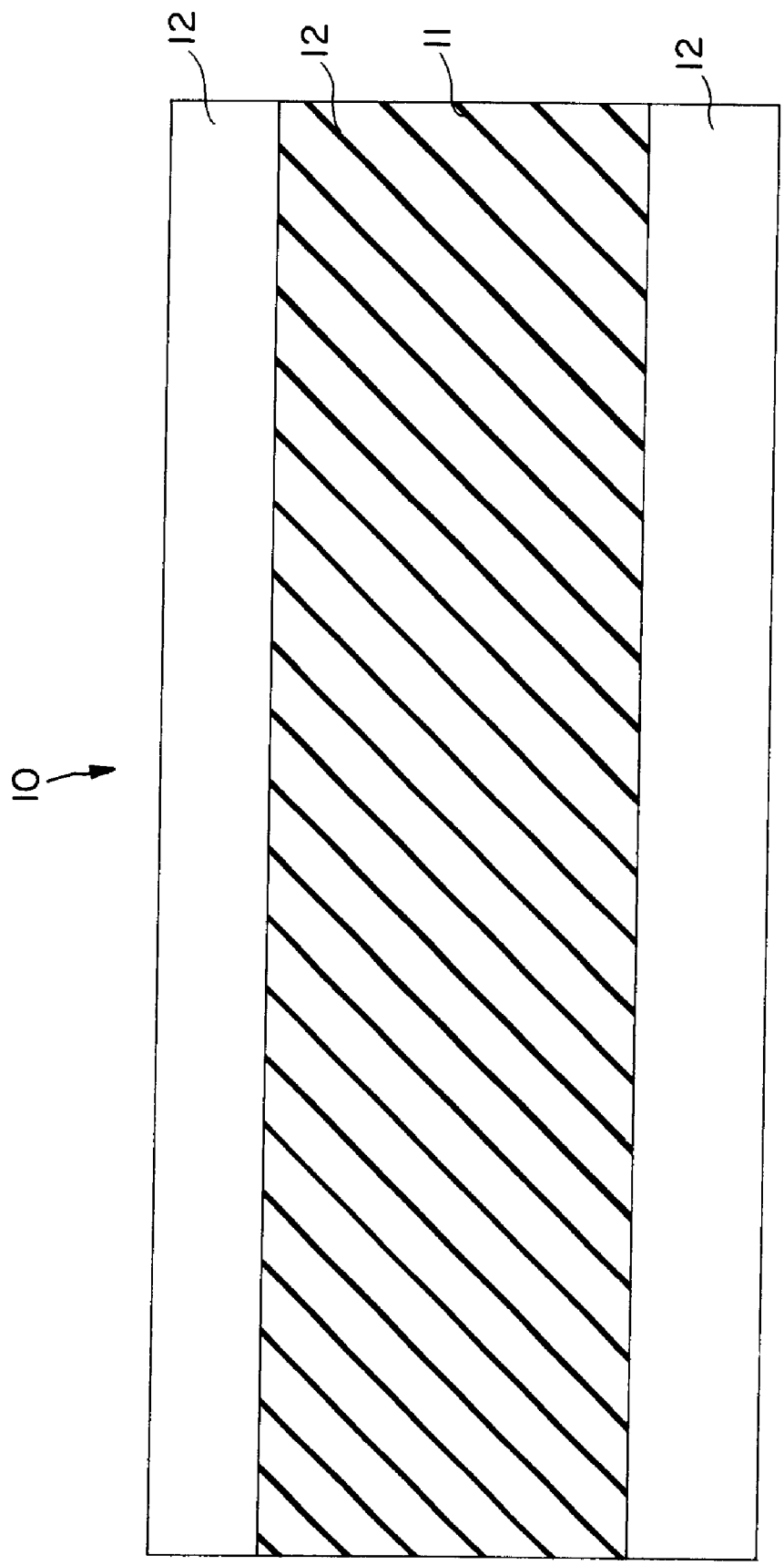
FIG. 1 is a cross-sectional view of a composite ICM according to an exemplary embodiment of the present invention.

As best illustrated by FIG. 1, a composite ICM 10 is provided which includes a base material 11 and an ion exchange material 12, which is preferably an ion exchange resin. Base material 11 is a membrane which is defined by a morphological structure comprising a microstructure of very highly elongated nodes interconnected by fibrils which form a structural network of voids or pores. Ion exchange material 12 substantially impregnates the membrane so as to render the interior volume substantially occlusive. Ion exchange material 12 may also be present on one or both sides of base material 11, as shown in FIG. 1.

The composite membrane of the present invention has superior dimensional stability in the in-plane direction, has high hardness and is uniform.

As used herein, high dimensional stability is defined as no more than 2% when calculated between the dry and fully hydrated state of the composite membrane according to the test set forth herein below.

High hardness is defined as a hardness of 1000 MPa and higher. A uniform product is defined as a composite membrane that has no pin holes or other discontinuities within the composite structure. The term "substantially occlusive" means that the interior volume is filled with the ion exchange material such that the final membrane has a Gurley number of greater than 10,000 seconds. A fill of 90% or more of the interior volume of the membrane should provide adequate occlusion for the purposes of the present invention.

A preferred base material is an expanded polytetrafluoroethylene (ePTFE) made in accordance with the teachings of U.S. Pat. No. 5,814,405, where the nodes are highly elongated and have an aspect ratio of 15:1 or greater. The combination of air permeability and strength have been shown to provide improved properties in IEM. The high strength provides the dimensional stability and the air permeability requires substantial void volume which when imbibed provides high ionic conductivity. The teachings of U.S. Pat. No. 5,814,405 are incorporated herein by reference.

Suitable ion exchange materials include, but are not limited to perfluorinated sulfuric acid resins, perfluorinated, carboxylic acid resins, polyvinyl alcohol, divinyl benezene, styrene-based polymers, and metal salts with or without a polymer. Solvents that are suitable for use with the ion exchange material, include for example, alcohols, carbonates, THF (tetrahydrofuran), water, and combinations thereof.

For application to the base material a solution is prepared containing an ion exchange material in solvent. The solution may be applied to the base material by a conventional coating technique including forward roll coating, reverse roll coating, gravure coating, or doctor roll coating, as well as dipping, brushing, painting, and spraying so long as the liquid solution is able to penetrate the interstices and interior volume of the base material. Excess solution from the surface of the membrane may be removed. The treated membrane is then dried in an oven. Oven temperatures may range from 60C–200C, but preferably 160C to 180C. Additional solution application steps, and subsequent drying, may be repeated until the membrane becomes completely transparent, which corresponds to the ICM having a Gurley number of greater than 10,000 seconds. Typically, between 2 to 60 treatments are required, but the actual number of treatments is dependent on the concentration and thickness of the base membrane. If the membrane is prepared without a support structure, both sides of the membrane may be treated simultaneously thereby reducing the number of treatments.

The inventors have discovered that membranes prepared according to he teachings in Branca et. al., in U.S. Pat. No. No. 5,814,405 (hereinafter referred to as '405) provide surprising and unexpected results as reinforcements in ICMs. Branca teaches microporous membranes described and characterized as having a morphological microstructure of highly elongated nodes interconnected by fibrils which forms a network of voids or pores through the spaces between the nodes and fibrils. The advantages that Branca recognized are the unique combination of strength and high air permeability offered by these microstructures.

There are several reasons why a skilled practitioner would not expect the membranes taught in '405 to be acceptable reinforcements for ICMs. First, one would expect the highly oriented structures to lead to large differences in strength in the in-plane directions. Such differences are not desirable in ICM reinforcements because they would lead to directional non-uniformities in the ICM, which one would expect to lead to different properties in the two in-plane directions. This could lead, for example, to differential shrinkage during thermal cycling of ICM in the fuel cell, which would impact the longevity of the membrane.

The second reason that would mediate against using these films as a reinforcement is the presence of the long, high aspect ratio nodes. One would expect this to be disadvantageous because it should be difficult to completely fill the pores around the nodes with the ionomer. The long nodes might be expected to block the imbibing process, leading to a film that is not fully occluded. Full occlusion of the membrane is preferred as is taught by Bahar. An additional consequence of the long, high aspect ratio nodes is that because they cover such a relatively large area, one might expect them to reduce the effective area that protons could travel once the membrane is imbibed. This would increase the resistance, thereby decreasing the ICMs desirability.

Surprisingly, the inventors have discovered that the use of base membranes such as those taught in '405 provide a durable ICM that has superior in-plane dimensional stability, high hardness, and uniformity.

The following testing procedures were employed on samples that were prepared in accordance with the teachings of the present invention.

TEST PROCEDURES

Matrix Tensile Test

Testing was carried out on an Instron model number 5567 (Instron Corporation series IX-automated material testing system 1.00). Samples were 1 inch wide by 6 inches long. Gauge length (distance between clamps) was 2 inches. Samples were pulled at a crosshead speed of 20 inches/minute, at 20C and 50% relative humidity. Elongation at break and max load were recorded. Matrix tensile strength was calculated by dividing the maximum load by the original cross-sectional area of the sample, and then dividing by the measured porosity. The porosity was determined by first calculating the density by dividing a sample's weight by it's length, width and thickness, and then dividing by the density of fully dense material. The density of fully-dense PTFE was taken to be 2.19 gr/cm$^2$.

Thickness

Thickness of the base material was determined with the use of a snap gauge from Mitutoyo No. 2804F-10. Measurements were taken in at least four areas of each specimen and then averaged. Thickness of the dried composite membrane obtained with the use of the above mentioned snap gauge and with the use of scanning electron microscopy.

Dimensional Stability and Through-Plane Hydration Expansion

Expansion in the transverse, longitudinal, and z-direction upon hydration was measured in the following manner: a 3 inch by 3 inch sample stored at least 1 day at room temperature and relative humidity between 40 and 60% was placed in 80° C. de-ionized water for 5 minutes to ensure complete hydration of the ion conducting membrane. The sample was then removed, and placed onto a rubber mat. The corner of the sample was lined up with a right angle reference and spread flat. The swollen transverse and longitudinal directions were measured with a ruler having an accuracy of 0.016 inches (1/64 inches). The swollen thickness was measured using the above mentioned thickness measurement technique. Dimensional stability was recorded as the percent change in each direction. Through-plane hydration expansion was recorded as the percent increase in thickness.

Hardness

Hardness of ICM samples was measured by Micro Photonics Inc., Irvine, CA using a CSEM Instruments, Inc., (Switzerland), micro hardness test unit. A 1 mm diameter tungsten carbide indenter was pressed into the ICM samples at a rate of 10 N/min. The maximum depth of penetration was set to 15,000 nm and the hardness was calculated in Mpa. This depth was chosen to eliminate effects from the substrate on which the sample was placed. A depth of less than 60% of the original sample thickness was employed in all tests.

When reaching a pre-set maximum value, the normal load was reduced until partial or complete relaxation occurred. This procedure was performed repetitively; at each stage of the experiment the position of the indenter relative to the sample surface was precisely monitored with a differential capacitive sensor.

The following set of conditions were used:

| | |
|---|---|
| Maximum Force | Not used |
| Maximum Depth | 15000 nm |
| Loading rate | 10N/min |
| Unloading rate | 10N/min |
| Pause | 15 sec |
| Calibrations and Preferences | 20%/0.010 30N/100 microns |
| Poisson coefficient | 0.50 |
| Computation Method | Oliver and Pharr |
| Indenter type | WC 1 mm diameter |
| Temperature | ambient |
| Relative Humidity | ambient |

Air Flow Data

The Gurley air flow test measures the time in seconds for 100 cm$^3$ of air to flow through a one square inch sample at 4.88 inches of water pressure. The sample is measured in a Gurley Densometer (ASTM 0726-58). The sample is placed between the clamp plates. The cylinder is then dropped gently. The automatic timer (or stopwatch) is used to record the time (seconds) required for 100 cm$^3$ of air to be displaced by the cylinder. This time is the Gurley number.

Mass per Area

Mass per Area measurements are made by measuring the weight of a sample of known size and dividing the weight by the length and width of the sample.

Pressure to Short

Pressure to short measurements were made by determining the pressure required (psi) to force gas diffusion media fibers through an ICM sample until an electrical short of 200 Ohms or less was present. The ICM of the present invention was placed between two layers of Carbel™ gas diffusion media CL (GDM) (available from Japan Gore-tex, Inc), with the electrode interface layer facing the membrane. A 1 in$^2$ (5.6 cm$^2$), top steel platen on a manually driven mechanical press was lowered to contact the sample resting on a steel bottom plate that was electrically isolated from the top platen. The pressure was then increased at approximately 50 psi per minute. A digital multimeter was used to measure the electrical resistance between the top and bottom platen. When the resistance dropped below 200 ohms, the pressure was recorded.

Aspect Ratio

The aspect ratio was measured according to the test procedure in Branca '405 column 8, lines 30–36.

Fuel Cell Durability

Fuel cell durability was determined in the following manner. An MEA was constructed using the composite ICM of the present invention as the electrolyte between PRIMEA™ 5510 electrodes (manufacturing by Japan Gore-Tex Inc.) with a Pt loading of 0.4 mg Ptcm$^2$ on both anode and cathode; and Carbel™ gas diffusion media CL (available from Japan Gore-Tex, Inc) on both the anode and cathode sides. Cell sizes in all cases were 25 cm$^2$. The assembly procedure for the cells was as follows:

a) Said membrane was placed between two PRIMEA™ 5510 electrodes (available from Japan Gore-Tex, Inc.) and pressed between platens with the top platen heated to 180 degrees C. A piece of 0.25" thick GR® sheet (available from W. L. Gore & Associates, Elkton, Md.) was placed between each platen and the electrode. Fifteen tons of pressure was applied for 3 minutes to the system to bond the electrodes to the membrane.

b) A 25 cm$^2$ triple serpentine channel design flowfield (provided by Fuel Cell Technologies, Inc, Albuquerque, N.M.) was placed on a workbench.

c) A window-shaped CHR (Furon) cohrelastic silicone coated fabric gasket (provided by Tate Engineering Systems, Inc., Baltimore, Md.) sized so a 25 cm$^2$ GDM will fit inside it was placed on top of the flow field.

d) One piece of Carbel CL® GDM was placed inside the gasket.

e) Another window-shaped gasket of polyethylene napthalate (PEN) film (available from Tekra Corp., Charlotte, N.C.) sized so it slightly overlapped the GDM on all sides was placed on top of the GDM.

f) The anode/membrane/cathode system prepared in (a) was placed on top of gasket.

g) Steps (b) through (e) were repeated in reverse order to form the cathode compartment.

h) The cell was placed in a vice and the eight retaining bolts were tightened to 45 in-lbs.

The cells were tested in a fuel cell at a cell temperature 60 degrees C. with 100 percent relative humidity inlet gases on both the anode and cathode. The gas applied to the anode was laboratory grade hydrogen supplied at a flow rate of 1.2 times greater than what is needed to maintain the rate of hydrogen conversion in the cell as determined by the current in the cell (i.e., 1.2 times stoichiometry). Filtered compressed air was supplied to the cathode at a flow rate of two times stoichiometry.

The cells were conditioned for 14 hours. The conditioning process involved cycling the cell at 60 degrees C. between a set potential of 600 mV for 30 minutes, 300 mV for 30 minutes and 950 mV for 0.5 minutes for 5 hours. Then a polarization curve was taken by controlling the applied potential beginning at 600 mVat then stepping the potential in 50 mV increments downwards to 400 m, then back upward to 900 mV in 50 mV increments, recording the steady state current at every step. The open circuit voltage was recorded between potentials of 600 mV and 650 mV. After the condition, the cathode flow was then switched to nitrogen for two hours, and a cyclic voltammogram was taken by sweeping the voltage at 100 mV/s between 0.1 V and 1.2 V three times and dynamically measuring the current during the sweeps. Sweeping the voltage at 2 mV/s between 10 mV and 600 mV obtained a hydrogen crossover value at 400 mV. An electrical shorting measurement was obtained by calculating the slope of the hydrogen crossover curve. Resistance (ohms) is 1/slope.

Finally, the cathode flow was switched back to air for 10–15 minutes and a polarization curve obtained as before.

The current was set to 0.8 A/cm$^2$ and the cell was operated at 90 degrees C., with 83 degrees C. dew point on both the anode and cathode, and 15 psig back pressure on both the anode and cathode. Every 168 hours (1 week), a CV was taken as described before, and the hydrogen crossover in mA/cm$^2$ recorded. Once the hydrogen crossover reached or exceeded 10 mA/cm$^2$, a to "physical" pin hole test was performed by applying a 2 psig over pressure on the cathode and measuring the bubble count on the anode side. The test was stopped and the time recorded if the bubble count exceeded 10 bubbles/minute in a tube with an inside diameter of one-eighth inch. This time (hours) was recorded as the fuel cell durability.

BACKGROUND OF EXAMPLES

As may be appreciated by one skilled in the art, the present invention provides for a polymeric resin composite membrane having a hardness, which is significantly higher than the hardness of conventional membranes, and higher machine and transverse dimensional stability. As a result, the membranes of the present invention provide improved puncture resistance and longer membrane lifetimes.

As described herein above, the polymeric resin composite membrane of the present invention can be advantageously employed in a fuel cell system. The membrane of the present invention operates longer at a given set of conditions due to the improved puncture resistance and the ability to retain initial dimensions during hydration. For example, the membrane of the present invention has a hardness of 2000 Mpa or greater, and a dimensional stability in the machine direction of less than or equal to 1%. At the operating conditions described in the Fuel Cell Durability Procedure of the present invention, the ICM of the present invention allows the membrane electrode assembly to operate for 2000 hours, or a 2.3 times improvement in lifetime compared to a membrane electrode assembly made with membrane of Comparative Example 1 of the present invention, which has a hardness of 958 Mpa and a dimensional stability in the machine direction of 7.3%.

Without intending to limit the scope of the present invention, the apparatus and method of production of the present invention may be better understood by referring to the following examples. All samples of ePTFE provided in the following examples were made in accordance with the teachings of U.S. Pat. No. 5,814,405.

More particularly, two types of ePTFE were prepared that had the following material properties:

|  | Type 1 | Type 2 |
| --- | --- | --- |
| Thickness (mils) | 1.2–1-4 | 0.7–0.9 |
| Gurley (sec) | 5.66 | 3.7 |
| Mass/Area (g/m$^2$) | 9.9 | 7.0 |
| Longitudinal Max Load (lbs.) | 7.53 | 5.297 |
| Transverse Max Load (lbs.) | 5.66 | 3.67 |
| Longitudinal Matrix Tensile (psi) | 42114 | 24960 |
| Transverse Matrix Tensile (psi) | 31361 | 30910 |
| Aspect Ratio | 118:1 | 70:1 |

Figure 2:
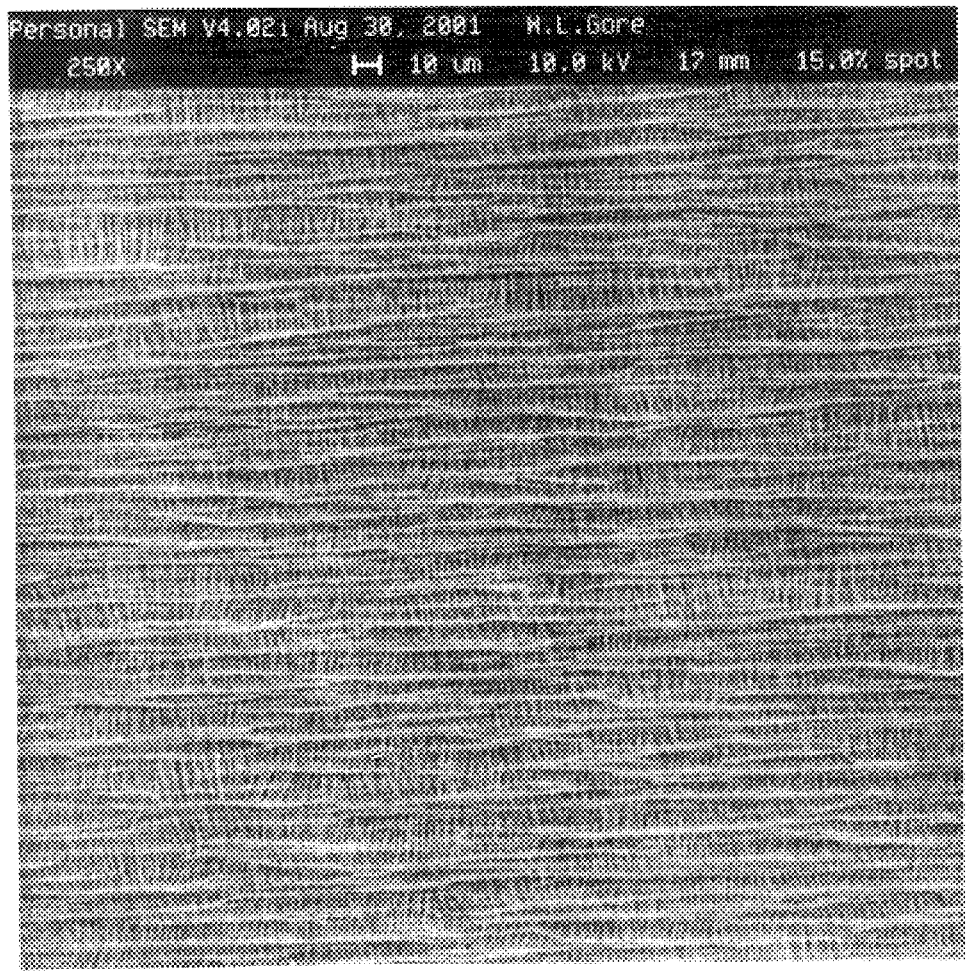
FIG. 2 is a scanning electron micrograph of the surface of a base material according to an exemplary embodiment of the present invention.
Figure 3:
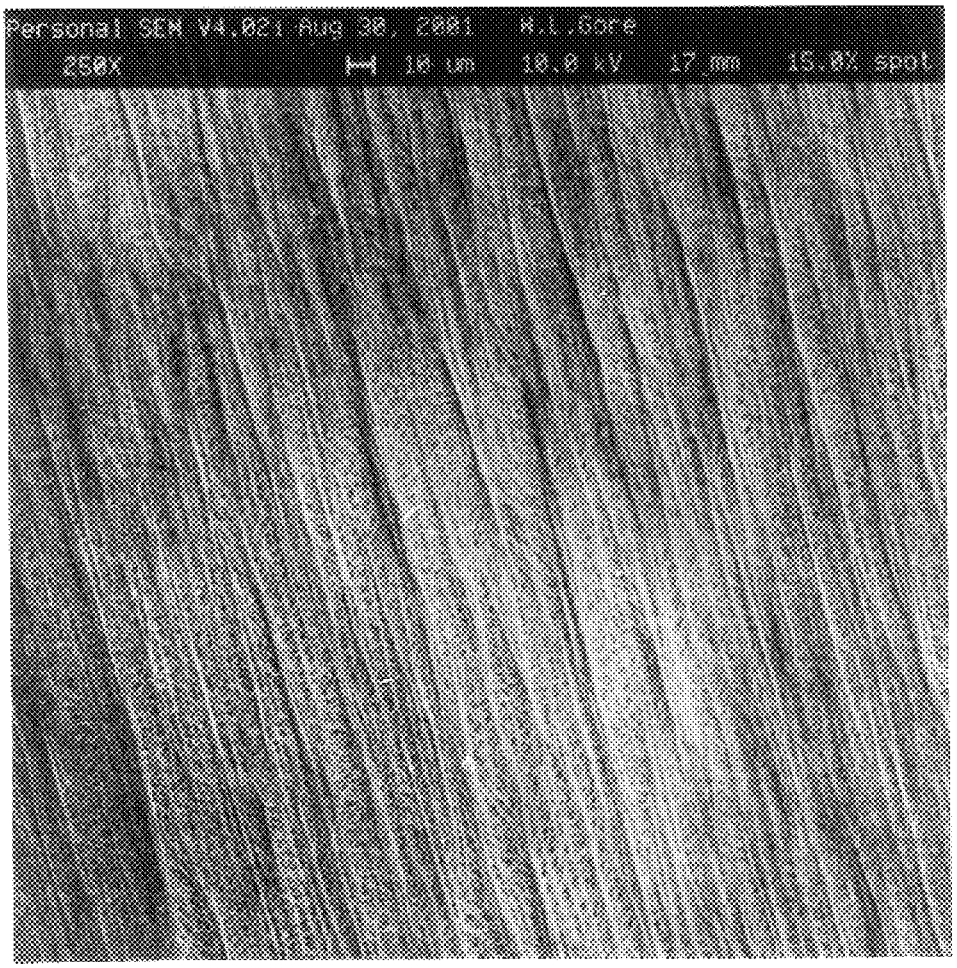
FIG. 3 is a scanning electron micrograph of the surface of a base material according to another exemplary embodiment of the present invention.

As may be appreciated by one skilled in the art, ePTFE membranes having a thickness of less than 1.5 mils may be produced with a wide range of physical property values. The physical property value ranges far exceed the two examples given above. FIG. 2 is an SEM of the surface of Type 1 membrane. Aspect ratio of the Type 1 membrane was determined from this SEM. FIG. 3 is an SEM of the surface of Type 2 membrane. Aspect ratio of the Type 2 membrane was determined from this SEM.

Example 1

A type 1 ePTFE membrane, having a nominal thickness of 1.38 mils was mounted on a 10 inch wooden embroidery hoop. An ion exchange material solution was prepared comprising a 100% by volume of a perfluorosulfonic acid/tetrafluroethylene copolymer resin solution (in H+ form which itself is comprised of 10% perfluorosulfonic acid/tetrafluoroethylene copolymer resin, 10% water, and a 80% mixture of low molecular weight alcohols commercially available from Asahi Glass and Chemical under the trademark name Flemion type F950 (950 EW) hereinafter "F950"). This solution was brushed on both sides of the membrane with a 4 inch foam brush to impregnate and substantially occlude the interior volume of the membrane. The sample was then dried for 2 minutes using a hair dryer, followed by oven drying at 180C for 3 minutes. The procedure was repeated two more times too fully occlude the interior volume. The thickness of the dried composite membrane was measured and found to be approximately 50% of the base material. The hardness may be found in Table 1; Dimensional stability of this sample in Table 2; and Strength and Matrix Tensile Strength in Table 5.

Example 2

A Type 2 ePTFE membrane, having a nominal thickness of 0.78 mils was mounted on a 10 inch wooden embroidery hoop. An ion exchange material solution was prepared comprising a 100% by volume of a perfluorosulfonic acid/tetrafluroethylene copolymer resin solution (in H+ form which itself is comprised of 10% perfluorosulfonic acid/tetrafluoroethylene copolymer resin, 10% water, and a 80% mixture of low molecular weight alcohols commercially available from Asahi Glass and Chemical under the trademark name Flemion type F950 (950EW) hereinafter "F950"). This solution was brushed on both sides of the membrane with a 4 inch foam brush to impregnate and substantially occlude the interior volume of the membrane. The sample was then dried for 2 minutes using a hair dryer, followed by oven drying at 180C for 3 minutes. The procedure was repeated three more times too fully occlude the interior volume. The thickness of the dried composite membrane was measured and found to be approximately 18% of the base material, (18 microns) Dimensional stability of this sample may be found in Table 2. The hardness may be found in Table 1.

Example 3

A sample using a procedure identical to that used in Example 2 was prepared. The Pressure to Short was measured and the results are shown in Table 3.

Example 4

A sample using a procedure identical to that used in Example 1 was prepared. This sample was tested for its fuel cell durability in accordance with the method described above. The Fuel Cell Durability as shown in Table 4 was 1000 hours.

Example 5

A sample using the procedure identical to that used in Example 2 was prepared. This sample was tested for its fuel cell durability in accordance with the method described above. The membrane lifetime described above was 2000 hours.

Comparative Example 1

A GORE-SELECT® membrane, a perfluorosulfonic acid/tetrafluoroethylene(TFE)lcopolymer cation exchange membrane, reinforced with ePTFE having a nominal thickness of 25 microns was manufactured according to Bahar et.al. U.S. Pat. No. 5,547,551. The samples underwent dimensional stability tests, hardness tests, and fuel cell durability tests, and strength measurements as described above. Results are shown in Tables 1–5.

Comparative Example 2

Nafion 101 (N101), a perfluorosulfonic acid/tetrafluoroethylene(TFE)/copolymer cation exchange membrane, unreinforced film of 1000 EW weight commercially available from Ion Power Inc. (Glasgow, Del.) having a quoted nominal thickness of 1 mil (0.025 mm) was obtained. The samples underwent hardness, dimensional stability, and fuel cell durability testing, as described above. The results are shown in Tables 1, 2 and 4, respectively.

Without intending to limit the scope of the present invention, data collected from testing the ion exchange membranes made in accordance with the procedures of the foregoing examples are summarized in the following tables. As may be appreciated by one skilled in the art, these tables reveal that the ion exchange membrane of this invention maintains its dimensions when hydrated and has superior hardness compared to known ePTFE reinforced and unreinforced ion exchange membranes. Furthermore, this inventive membrane has improved lifetime when operated in a fuel cell.

TABLE 1

Hardness

| Sample ID | Hardness (MPa) | Thickness (um) |
|---|---|---|
| Example 1 | 2125 | 27 |
| Example 2 | 2308 | 25 |
| Comp. Ex. 1 | 958 | 25 |
| Comp. Ex. 2 | 722 | 25 |

TABLE 2

Dimensional Stability and Through-Plane Hydration Expansion

| | Dimensional Stability (% change in dimensions) | | Through-Plane |
|---|---|---|---|
| Sample ID | Machine-Dir | Transverse-Dir | Expansion % |
| Example 1 | 0.0 | 0.0 | 51 |
| Example 2 | 2.4 | 0.0 | 34 |
| Comp. Ex. 1 | 7.3 | 12.5 | 30 |
| Comp. Ex. 2 | 25 | 10.4 | 20 |

TABLE 3

Pressure to Short

| Sample ID | Pressure to Short (psi) |
|---|---|
| Example 3 | 418 |
| Comp. Ex. 1 | 175 |

TABLE 4

Fuel Cell Durability

| Sample ID | Lifetime (hours) |
|---|---|
| Example 4 | 1000 |
| Example 5 | 2000 |
| Comp. Ex. 1 | 870 |
| Comp. Ex. 2 | 350 |

TABLE 5

Strength

| | Matrix Tensile Strength (psi) | | Strength (psi) | |
|---|---|---|---|---|
| Sample ID | Machine | Transverse | Machine | Transverse |
| Example 1 | 10,547 | 10,316 | 9,775 | 9,350 |
| Comp. Ex. 1 | 4,985 | 4,820 | 4,675 | 4,467 |

Having described the invention, what is claimed is:

1. A composite membrane comprising: (a) an expanded polytetrafluoroethylene membrane having an internal microstructure consisting essentially of nodes interconnected by fibrils, said nodes aligned substantially in parallel, being highly elongated and having an aspect ratio of 25:1 or greater; and (b) an ion exchange material impregnated throughout the membrane, the impregnated expanded polytetrafluoroethylene membrane having a Gurley number of greater than 10,000 seconds, wherein the ion exchange material substantially impregnates the membrane so as to render an interior volume of the membrane substantially occlusive.

2. The composite membrane of claim 1 with a hardness of greater than 1000 MPa.

3. The composite membrane of claim 1 with a hardness of greater than 1500 MPa.

4. The composite membrane of claim 1 with a hardness of greater than 2000 MPa.

5. The composite membrane of claim 1 with dimensional stability in the machine direction of less than 6%.

6. The composite membrane of claim 1 with dimensional stability in the machine direction of less than 4%.

7. The composite membrane of claim 1 with dimensional stability in the machine direction of less than 2%.

8. The composite membrane of claim 1 with dimensional stability in the transverse direction of less than 10%.

9. The composite membrane of claim 1 with dimensional stability in the transverse direction of less than 8%.

10. The composite membrane of claim 1 with dimensional stability in the transverse direction of less than 6%.

11. The composite membrane of claim 1 with dimensional stability in the transverse direction of less than 4%.

12. The composite membrane of claim 1 with pressure to short of greater than 400 psi.

13. The composite membrane of claim 1 with pressure to short of greater than 200 psi.

14. A membrane electrode assembly comprising the composite membrane of claim 1 and an anode and a cathode.

15. A fuel cell comprising the membrane electrode assembly of claim 14.

16. An electrolytic cell comprising the composite membrane of claim 1 and at least an anode and a cathode.

17. A composite of claim 1 with strength greater than 8,500 psi in the machine direction.

18. A composite of claim 1 with strength greater than 8,500 psi in the transverse direction.

19. Composite of claim 1 with through-plane hydration expansion greater than 30%.

20. Composite of claim 1 with through-plane hydration expansion greater than 40%.

21. A composite membrane comprising a base material having a microstructure of nodes and fibrils forming interconnected passages and pathways and having a hardness greater than 1000 mPa, and an ion exchange material impregnated throughout the base material, the composite membrane having a Gurley number of greater than 10,000 seconds, wherein the ion exchange material substantially impregnates the base membrane so as to render said passages and pathways substantiatly occlusive.

* * * * *